Aug. 25, 1970 K. C. HAGWOOD 3,525,512

SUPERLIFT UNIT WITH CAR TRIM HEIGHT CONTROL

Filed May 24, 1968

INVENTOR.
Kenneth C. Hagwood
BY
J.C. Evans
ATTORNEY

United States Patent Office 3,525,512
Patented Aug. 25, 1970

3,525,512
SUPERLIFT UNIT WITH CAR TRIM HEIGHT CONTROL
Kenneth C. Hagwood, Dayton, Ohio, assignor to General Motors Corporation, Detroit, Mich., a corporation of Delaware
Filed May 24, 1968, Ser. No. 731,911
Int. Cl. B60g 11/26; F16f 5/00
U.S. Cl. 267—64        2 Claims

ABSTRACT OF THE DISCLOSURE

In preferred form, a shock absorber and air booster spring assembly having a fluid filled hydraulic reservoir formed in part by an elastic bladder which yields to compensate for thermal expansion of the hydraulic fluid in the reservoir. A reservoir tube around the bladder defines an expansion chamber therebetween to receive the expanded fluid. A bleed port in the reservoir tube serves as an outlet port for air booster spring pressurized fluid following an exhaust path formed in part by the expansion chamber. A flexible sleeve that forms part of the air booster spring chamber constitutes a valve that controls exhaust flow through the port to maintain a predetermined distance between the sprung and unsprung vehicle masses.

---

This invention relates to a combination shock absorber and air booster spring assembly for automobiles or the like and, more particularly, to such an assembly with a fluid filled reservoir including means to compensate for thermal expansion of the fluid and means to control exhaust of air from the air booster spring in response to changes in vehicle loading.

Prior shock absorber and air spring assemblies have reservoir chambers with air spaces above the fluid level which compensate for thermal expansion of the hydraulic fluid which partially fills the reservoir chamber. To improve such units for use in inclined, horizontal and other operating positions, it is desirable to completely fill the shock absorber reservoir chamber with hydraulic fluid. This prevents fluid aeration and assures continuous dampening action. In such cases, it is necessary to compensate for thermal expansion in the fluid filled reservoir.

A further desirable feature in combination assemblies of the type under consideration is the provision of an integral valve on the assembly that controls the degree of inflation of the air booster spring portion of the assembly so as to automatically maintain a desirable vehicle trim height even when the vehicle is heavily loaded.

An object of the present invention is to improve combination shock absorber and air booster spring assemblies by means in the hydraulic reservoir chamber to compensate for thermal expansion of hydraulic fluid filling the reservoir chamber with the same means defining an exhaust fluid path protected by both the reservoir tube and a rigid dust shield portion of the air booster spring; the exhaust path from the air booster spring portion of the assembly communicating with the bleed port in the reservoir tube through which pressurized air passes when a reversely bent flexible sleeve of the air booster spring is moved by the sprung mass of the vehicle from a desired trim height position.

Further objects and advantages of the present invention will be apparent from the following description, reference being had to the accompanying drawings wherein a preferred embodiment of the present invention is clearly shown.

IN THE DRAWINGS

Figure 1:
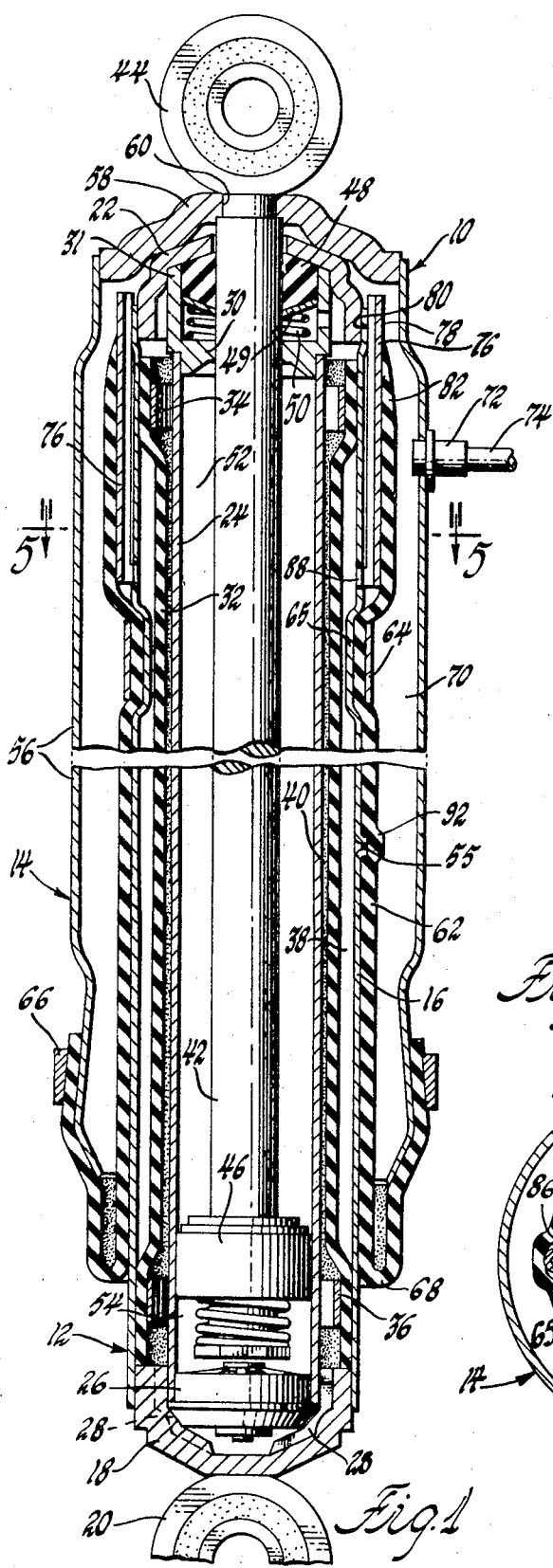
FIG. 1 is a vertical cross-sectional view of a shock absorber and air booster spring assembly incorporating the features of this invention shown in the fully collapsed position.

In FIG. 1 of the drawings, a shock absorber and air booster spring assembly 10 is illustrated. Assembly 10 basically includes a shock absorber portion 12 and an air booster spring portion 14. Assembly 10 is normally substituted for a conventional direct acting shock absorber and placed between a sprung mass and an unsprung mass of the vehicle adjacent the main suspension.

The shock absorber portion 12 of assembly 10 will function in a normal manner to damp movement between the sprung mass and the unsprung mass of the vehicle relative to one another independent of the air booster spring portion 14. Pressurization of the air booster spring portion 14 of the assembly 10 with a fluid such as air or other suitable gas will supplement the primary suspension spring support of the sprung mass of the vehicle on the unsprung mass. Thus, the vehicle can be maintained level even when it is heavily loaded.

The shock absorber portion 12 of assembly 10 includes an outer reservoir tube 16. A circular cup-shaped bottom end cap 18 securely fits within and encloses the bottom end of reservoir tube 16. The juncture between the reservoir tube 16 and bottom end cap 18 is a fluid tight connection. A fitting 20 attached to the exterior surface of the end cap 18 is adapted to secure the shock absorber and air booster spring assembly 10 to the unsprung mass of the vehicle. The top end of reservoir tube 16 is enclosed by an inverted cup-shaped end cap 22 having a fluid tight connection therewith. Located concentrically within the reservoir tube 16 is a smaller diameter pressure cylinder tube 24. A base valve 26 is held within the bottom end of pressure cylinder tube 24 by a plurality of tabs 28 extending inwardly from the bottom end cap 18. An upright cup-shaped rod guide 30 is disposed within the upper end of pressure cylinder tube 24. An upwardly extending circumferentially continuous side 31 of cup-shaped rod guide 30 is secured to the surrounding top end cap 22 to coaxially position the pressure cylinder tube 24 relative to reservoir tube 16. Rod guide 30 is axially held within the end of pressure cylinder tube 24 by the end cap 22 which is attached to the reservoir tube 16 in a fluid tight manner.

Disposed within the annular space between the reservoir tube 16 and the pressure cylinder tube 24 is a cylindrically shaped, elongated elastic bladder 32 made from a material such as rubber. Bladder 32 is held at opposite ends thereof and in sealing retaining engagement against the inner surface of reservoir tube 16 by rings 34 and 36. An annular enclosed expansion chamber 38 is formed between the reservoir tube 16 and bladder 32. A variable volume shock absorber reservoir chamber 40 is formed between bladder 32 and the outer surface of pressure cylinder tube 24.

Concentrically located within pressure cylinder tube 24 and extending through axial bores within rod guide 30 and end cap 22 is a cylindrical reciprocable piston rod 42. A top end of the piston rod 42 which projects through end cap 22 is secured to a fitting 44 exteriorly of the shock absorber 12 adapted to secure the assembly 10 to the sprung mass of a vehicle. A valved piston 46, which is coaxially supported within pressure cylinder tube 24, is attached to the lower end of piston rod 42.

Relative movement between the sprung mass and the unsprung mass of a vehicle causes the interconnected piston rod 42 and piston 46 to reciprocate within the pressure cylinder tube 24. Sealingly surrounding the piston rod 42 and supported within the hollow interior of cup-shaped rod guide 30 is a piston rod seal 48 made from a material such as rubber. Seal 48 is biased against a seal washer 49 and the end cap 22 by a seal spring 50 which is compressed between the seal washer 49 and rod guide 30. The seal 48 prevents leakage of hydraulic fluid from the shock absorber interior upon reciprocation of the piston rod 42 within pressure cylinder tube 24.

A variable volume rebound chamber 52 is formed within pressure cylinder tube 24 between rod guide 30 and valved piston 46. A variable volume compression chamber 54 is formed within a pressure cylinder tube 24 between base valve 26 and valved piston 46. Both chamber 52 and chamber 54 are completely filled with hydraulic fluid during normal operation of the shock absorber. Movement of valved piston 46 within pressure cylinder tube 24 toward rod guide 30 necessarily decreases the volume of the rebound chamber 52. Likewise, movement of the valved piston 46 within pressure cylinder tube 24 towards base valve 26 decreases the volume of compression chamber 54. Valve components (not shown) in piston 46 regulate the flow of hydraulic fluid between chambers 52 and 54 caused by reciprocation of piston 46 within the pressure cylinder tube 24. The regulation of hydraulic flow produces the predetermined damping of relative movement between sprung and unsprung masses of the associated vehicle. For a more detailed explanation of a valved piston of the type found in the preferred embodiment, reference is made to U.S. Pat. 2,695,034, it being understood that the details of valving form no part of the present invention.

Movement of piston 46 upwards toward rod guide 30 increases the volume of compression chamber 54 by a greater amount than it decreases the volume of rebound chamber 52. The axial dimensions change equally in either chamber; but because piston rod 46 occupies a substantial volume of the rebound chamber 52, it follows that upon movement of piston rod 42 downward within pressure cylinder tube 24 the decrease in compression chamber volume will be greater than the increase in rebound chamber volume. Likewise, upon reverse piston rod movement, the increase in compression chamber volume will be greater than the decrease in rebound chamber volume. The difference in each case equals the volume of the piston rod in either entering or exiting the interior of the pressure cylinder tube 24. Because of this volumetric inequality, a supplementary quantity of hydraulic fluid must be supplied to the compression chamber 54 upon movement of the piston 46 upward in pressure cylinder tube 24, and means must be provided to accept excess fluid from the compression chamber 54 uopn movement of piston 46 downward in pressure cylinder tube 24. The reservoir chamber 40 performs this fluid supply function.

In accordance with certain features of the present invention, the reservoir chamber 40 between the outer surface of pressure cylinder tube 24 and the elastic bladder 32 is completely filled with hydraulic fluid. By virtue of this arrangement, the assembly can be located in an inclined operating position or even a horizontal operating position and the base valve 26 will be maintained submerged in hydraulic fluid. This prevents aeration of the shock absorber fluid during reciprocation of the piston 46 within pressure cylinder tube 24 and thereby assures desirable continuous fluid damping by the shock absorber assembly 10.

Since the bladder 32 is made from a suitable elastic material, such as rubber, when the hydraulic fluid in the reservoir chamber 40 is heated during operation of the assembly, thermal expansion therein will be accommodated by the bladder 32 moving radially outwardly of the pressure cylinder tube 24 into the expansion chamber 38. The reservoir tube 16 includes a bleed port 55 which enables communication of the expansion chamber 38 with atmosphere to control inflation of the air booster spring assembly 14 and to maintain a desirable vehicle trim height. An explanation of this aspect of the invention is described hereinafter.

The base valve 26 which is located between reservoir chamber 40 and compression chamber 54 regulates the flow of hydraulic fluid therebetween. Valve components (not shown) within base valve 26 permit hydraulic fluid from the reservoir chamber 50 to enter the compression chamber 54 upon movement of piston rod 42 upwardly within the pressure cylinder tube 24. Other valve components (not shown) within base valve 26 permit hydraulic fluid from the compression chamber 54 to flow back into the reservoir chamber 40 upon movement of piston rod 42 downwardly within the pressure cylinder tube 24. For a more detailed explanation of base valve 26 reference is made to U.S. Pat. 2,695,034, it being understood that the details of the valving form no part of the present invention but are merely representative of one suitable valving arrangement for controlling hydraulic fluid flow between pressure cylinder tubes 24 and reservoir chamber 40.

The air booster spring portion 14 of assembly 10 includes a cylindrical dust shield 56 concentrically with and radially spaced from reservoir tube 16. A circular disk-shaped cover 58 is secured within the upper end of dust shield 56 and is attached to piston rod 42 at a reduced diameter portion 60 of the piston rod 42. The juncture between the cover 58 and piston rod 42 and the juncture between the cover 58 and dust shield 56 are fluid tight connections. Attached to the lower end of dust shield 56 and coaxially extending around reservoir tube 16 is a cylindrical resilient sleeve 62. More particularly, the upper portion of sleeve 62 surrounds reservoir tube 16 and is pressed against its outer surface by a band 64. The band 64 presses the sleeve 62 into an annular groove around the outer surface of the reservoir tube 16 defined by a radially inwardly bent surface 65 in the tube 16. The lower portion of sleeve 62 is turned back over itself and secured to the lower end of dust shield 56 by a shrunk band 66. The process of turning the lower end back over itself forms a return bend portion 68 within the resilient sleeve 62 which joins the upper portion of sleeve 62 located around the reservoir tube 16 with a lower portion of sleeve 62 attached to dust shield 56. The annular space enclosed by the dust shield 56, cylindrical sleeve 62, and cover 58 defines an air booster spring chamber 70. A fitting 72 on dust shield 56 connects the air booster spring chamber 70 with an air pressure source (not shown) through a conduit 74. The air pressure source is continuously connected to the air booster spring chamber 70 and of sufficient capacity to replenish the pressurized air which escapes through the bleed port 55. When pressurized air from the pressure source enters the air booster spring chamber 70 through conduit 74 and the fitting 72, the resulting air pressure within the air booster spring chamber 70 causes its volume to be enlarged by the elongation of assembly 10.

Figure 5:
FIG. 5 is an end cross-sectional view of the assembly taken along lines 5—5 of FIG. 1 and showing the placement of vent tubes intercommunicating the air booster spring chamber and an expansion chamber for fluid filling the shock absorber reservoir chamber.

In accordance with certain principles of the present invention, the illustrated embodiment includes means by which pressurized air is drawn from the air booster spring chamber 70 and discharged into the atmosphere whenever a predetermined maximum elongation of assembly 10 is exceeded because the sprung mass of a vehicle is raised above its desired trim height. As can best be seen in FIGS. 1 and 5, the air pressure discharge means includes a plurality of vent tubes 76 located at spaced points around the upper end of reservoir tube 16. Each of the tubes 76 has a curved surface 78 with side edges held against the outer surface of reservoir tube 16 at a point 80 by an end extension 82 on the sleeve 62 that is arranged to axially overlap each of the tubes 76 at a point above where the band 64 seals sleeves 62 to reservoir tube 16. As best seen in FIG. 5, each tube 76 thereby forms an axial opening 84 between itself and the outer surface of reservoir tube 16. Furthermore, each tube 76 separates the extension 82 from the outer surface of the reservoir tube 16 to form another axial opening 86. A lower end 88 of vent tube 76 is shaped as a ring with a small break which extends through reservoir tube 16 to fluidly communicate the air booster spring chamber 70 with expansion chamber 38 formed between reservoir tube 16 and elastic bladder 32. The inwardly bent interior surface 65 of reservoir tube 16 is located at a point immediately below the lower end 88 of vent tube 76 and will hold the flexible bladder 32 away from the radially inwardly projecting end 88 of vent tube 76 as the hydraulic fluid filling the reservoir chamber 40 expands during operation of the assembly. It is important to note that the end 88 of vent tube 76 is located in the reservoir tube immediately above where the band 64 seals against sleeve 62. This location of the end 88 of vent tube 76 constitutes the inlet of exhaust flow path from the pressurized chamber of the air booster spring 14. The air booster spring chamber 70 is thus communicated by openings 84, 86 with expansion chamber 38.

By virtue of this arrangement, an exhaust path from the air booster spring chamber 70 is present that is protected against outside forces by the dust shield 56, the resilient sleeve 62 including the extension 82 thereof and, in part, the reservoir tube 16, itself. This path terminates in the bleed port 55 which is opened and closed by the return bend portion 68 of sleeve 62, thus constituting a valve.

Figure 2:
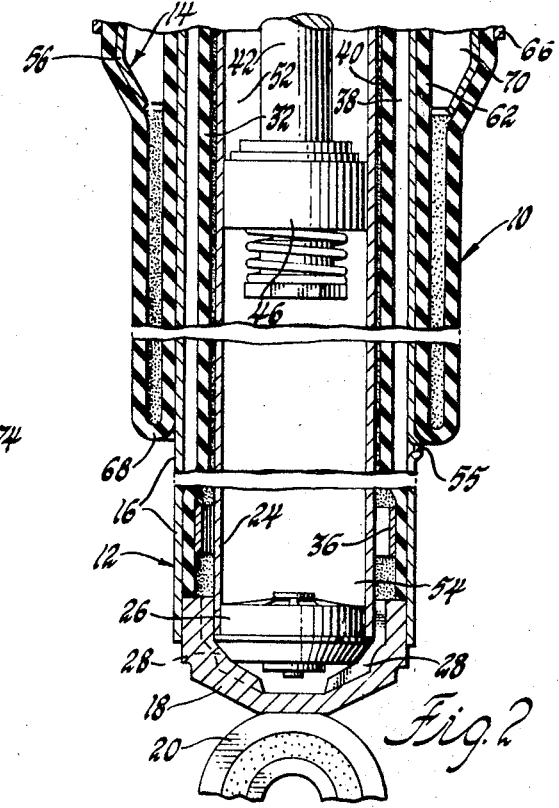
FIG. 2 is a vertical cross-sectional view of a lower portion of a shock absorber and air booster spring assembly in the partially extending position which occurs when the vehicle is lightly loaded.
Figures 3, 4:
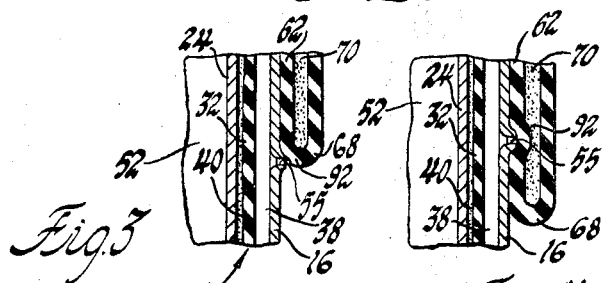
FIG. 3 is a fragmentary vertical cross-sectional view showing the assembly in a normal position for a moderately loaded vehicle.
FIG. 4 is a fragmentary vertical cross-sectional view showing the assembly immediately after a heavy load has been added to the vehicle.

More particularly, bleed port 55 is covered by an overlaying portion 92 of resilient sleeve 62 as best seen in FIG. 1. When the air spring assembly 14 is deflated, as seen in FIG. 1, a predetermined pressure in the air booster spring chamber 70 and a like pressure in the expansion chamber 38 exists in the assembly. The only effective sealing force on the outwardly directed protrusion that defines the bleed port 55 is the elastic action of sleeve 62. When assembly 10 is extended as best seen in FIG. 2, the return bend portion 68 of the sleeve 62 moves axially upward upon reservoir tube 16 to uncover bleed port 55. FIG. 2 represents the position which assembly 10 would maintain while the vehicle is very lightly loaded. Until a sufficient load is placed in the vehicle to cause the sprung mass of the vehicle to move downward with respect to the unsprung mass of the vehicle thus causing the return bend portion 68 to move downward over the bleed valve 55 as shown in FIG. 3, the air booster spring portion 16 of assembly 10 does not act as a suspension member. When a heavy load is placed in the vehicle, the assembly 10 will assume a position which will cause the return bend portion 68 to sleeve 62 to move downward past bleed port 65 thus covering it with an overlaying portion 92 of sleeve 62. FIG. 4 represents the position of assembly 10 in a transient stage immediately after a heavy load has been added to the vehicle. With bleed port 55 covered by overlaying portion 92, the pressure level within the air booster spring chamber 70 rapidly increases. An expansive force resulting from the high pressure level within chamber 70 causes the air booster spring portion 16 of assembly 10 to axially move away from the shock absorber portion 12. This elongation of assembly 10 moves the return bend portion 68 upward toward bleed port 55. An equilibrium position, as shown in FIG. 3, is rapidly established at which position the overlaying portion 92 of sleeve 62 substantially covers bleed port 55. In this position, the overlaying portion 92 almost completely closes the bleed port 55. A relatively small portion of bleed port 55 remains open, however, to exhaust a sufficient quantity of pressurized air from the expansion chamber 38 to maintain the assembly 10 at a predetermined axial elongation which corresponds to the desired trim height.

While the embodiment of the present invention as herein described constitutes a preferred form, it is to be understood that other forms might be adapted.

What is claimed is as follows:

1. A shock absorber and air booster spring assembly comprising: a hydraulic direct acting shock absorber including a pressure cylinder tube; valved reciprocable piston means coaxially supported within the pressure cylinder tube for the regulation of hydraulic fluid flow therethrough; a cylindrical elastic bladder coaxially disposed around the pressure cylinder tube forming an expandable reservoir chamber; hydraulic fluid filling said reservoir chamber; a reservoir tube coaxially surrounding and attached to said bladder to define an expansion chamber therebetween to accommodate for thermal expansion of the hydraulic fluid in the reservoir chamber; a piston rod attached to said piston means for reciprocating said piston means in said pressure cylinder tube; said rod extending axially outward from the pressure cylinder tube; a cylindrical dust shield tube connected to said piston rod exteriorly of the pressure cylinder tube; said cylindrical dust shield tube being in part concentrically disposed aroud the reservoir tube in spaced relationship therewith; a flexible tubular sleeve member having one end coaxially disposed around and secured to said reservoir tube; a clamp ring sealingly securing said one end of said sleeve member to said reservoir tube; said tubular sleeve member having another end attached to the dust shield to define an air booster spring chamber between said reservoir tube and said dust shield tube; said tubular sleeve member further having a reverse bend portion formed within the tube by turning an end portion of the sleeve member back over the sleeve; a vent tube attached to said reservoir tube for communicating the air booster spring chamber with said expansion chamber at a point above said clamp ring; said vent tube being located within said air booster spring chamber during relative movement between extreme rebound and compression positions of said rod; a bleed port in the reservoir tube below said clamp rings for communicating the expansion chamber with atmosphere; and expansion chamber communicating said vent tube and said bleed port in by-pass relationship to said clamp ring interiorly of said reservoir tube; said bleed port being axially positioned through the reservoir tube to cause the bleed port to be covered by said sleeve member upon a predetermined shortening of the shock absorber and air booster spring assembly; said sleeve member constituting a valve.

2. In a combination shock absorber and air booster spring assembly of the type including a pressure cylinder tube surrounded by a reservoir tube defining a hydraulic reservoir chamber around the pressure cylinder tube; a valved reciprocable piston slidably supported within the pressure cylinder tube and reciprocated therein by a piston rod extending axially outward from the pressure cylinder tube and sealed around its periphery by a seal assembly; means formed around the reservoir tube including a dust shield connected to the piston rod exteriorly of the pressure cylinder tube for defining a pressurizable air booster spring chamber; said cylindrical dust shield tube being in part concentrically disposed around the reservoir tube in spaced relationship therewith; said chamber forming means also including a flexible tubular sleeve member having one end coaxially disposed around and secured to said reservoir tube; said tubular sleeve member having another end attached to said dust shield to define the air booster spring chamber between said reservoir tube and said dust shield tube; said tubular sleeve member further having a reverse bend portion formed within the tube by turning an end portion of the sleeve member back over the sleeve; the improvement comprising: elastic bladder means coaxially interposed between the pressure cylinder tube and the reservoir tube to form an elastic wall of the hydraulic reservoir chamber to compensate for thermal expansion of hydraulic fluid within the reservoir chamber; an expansion chamber formed between said elastic bladder means and said reservoir tube; a vent tube attached to said reservoir tube for communicating the air booster spring chamber with said expansion chamber; said vent tube being totally located within the air booster spring chamber during relative movement between extreme rebound and compression positions of said piston rod to prevent impact damage to said vent tube; a bleed port through the reservoir tube for communicating the expansion chamber with atmosphere; said expansion chamber communicating said vent tube and said bleed port; said bleed port being axially positioned on the reservoir tube to cause the bleed port to be covered by the sleeve member upon a predetermined shortening of the shock absorber and air booster spring assembly to produce an exhaust valving control of pressure in the air booster spring chamber.

References Cited

UNITED STATES PATENTS

| | | | |
|---|---|---|---|
| 3,149,830 | 9/1964 | Broadwell | 267—64 |
| 3,447,644 | 6/1969 | Guckett | 188—88 |

JAMES B. MARBERT, Primary Examiner

U.S. Cl. X.R.

188—88